Patented May 12, 1942

2,282,457

UNITED STATES PATENT OFFICE 2,282,457

DEHYDRATING ALCOHOL

Charles A. Cohen, Elizabeth, N. J., assignor, by mesne assignments, to Standard Oil Development Company, a corporation of Delaware No Drawing. Application December 29, 1939, Serial No. 311,591

2 Claims. (Cl. 202—57)

The present invention is concerned with absolutely anhydrous mono-atomic alcohols and a method for their production. An absolutely anhydrous alcohol is an alcohol which does not show more than .02% of water when determined by the acetyl chloride method of Smith and Bryant, J. A. C. S. 57, 841 (1935).

Attempts have heretofore been made without success to remove the last traces of water from the lower boiling mono-atomic alcohols so as to secure an absolutely anhydrous alcohol. The lower molecular weight mono-atomic alcohols form with water azeotropic mixtures of constant boiling point. These azeotropic mixtures contain fixed amounts of water, as, for example, the constant boiling mixture of ethyl alcohol and water contains 95% alcohol and isopropyl alcohol forms a constant boiling mixture containing 91% alcohol. Alcohol has been dried over calcium oxide. This method does not remove all of the water unless enormous quantities and repeated application of freshly burned lime is used. The reason for this is that the dehydration reaction with lime does not take place in the solution phase, but is a surface reaction which necessitates the exposure of fresh lime particles to the water to be removed at all times. Another method by which water has been removed from alcohols is by the so-called ternary mixture method. In this process a third liquid, such as benzol or isopropyl ether, is added to the wet alcohol and the mixture fractionated. The added liquid possesses the property of forming with alcohol and water an azeotropic or constant boiling mixture which has a lower boiling point than the azeotropic mixture of alcohol and water. After nearly all the water has been removed, the added component is removed with some of the alcohol as an intermediate boiling binary finally leaving substantially dry alcohol. However, the most nearly absolutely anhydrous alcohol achieved by the ternary mixture method has been an alcohol of 99.9% purity.

According to the present invention, it has been found possible, by means of the addition to the alcohol of a substance which will, while in solution, chemically unite with the water in the alcohol to yield an alcohol-insoluble hydrated oxide, to produce an alcohol which is absolutely dry by the acetyl chloride method. The present invention is applicable to either azeotropic mixtures of monohydric alcohols with water or to alcohols containing less water than that contained in the azeotropic mixture of the particular alcohol, and the present invention is particularly suitable for the complete dehydration of the mono-atomic alcohols containing from 1 to 4 carbon atoms to the molecule. Generally defined, the substance added to the alcohol is one from which an alcohol-insoluble hydrated oxide may be formed. The substance added to the alcohol may be either as the pure metal or as a metallo-organic compound decomposable by water to yield a hydrated metallic oxide. As examples of the former, there may be mentioned the alkaline earth metals, such as calcium or magnesium, or the metals may be such metals as aluminum, tin, or zinc in their metallic state. When the metals are used, it is also necessary to use an activator in an amount up to about 2% based upon the weight of the metal to be activated and, as activators, iodine, stannic chloride, and mercuric salts, such as mercuric chloride, have been found to act very proficiently. In operation, the metal is added to the alcohol to be dehydrated and a small amount of the activator is then added, after which the whole is warmed slightly to initiate the reaction which, once started, proceeds with great rapidity. When the reaction is complete, the completely dehydrated alcohol is distilled off, care being taken to protect it from contamination by moisture from the air. When the substance to be added to the alcohol is in the nature of a metallo-organic compound, it is preferred to use a metal alcoholate in which the alcoholate radical is derived from the same alcohol as that which is to be dehydrated. These metal alcoholates may be prepared according to the process disclosed in my copending application Serial No. 311,322 filed December 28, 1939. Although the metal alcoholates are the preferred species, other water decomposable metallo-organic compounds, in which the metal forms with water an alcohol-insoluble hydrated oxide and the organic radical forms upon decomposition a compound volatile at a temperature below the boiling point of the alcohol to be dehydrated, may be used. When the metallo-organic compound is added to the alcohol, reaction sets in immediately and is completed within a short space of time. After completion of the reaction, the alcohol may then be distilled off. In the interest of economy, it is preferred to add stoichiometrical proportions of either the metal or the metallo-organic compound. However, an excess of either over stoichiometrical proportions is not detrimental since the metallo-organic compound decomposes at a temperature above the boiling point of the alcohol and the alcohol may be removed by distillation without difficulty. Absolutely anhydrous alcohols, such as are produced by the methods of this invention, are highly hygroscopic, therefore provision should be made both during the dehydration step and in the subsequent distillation step to prevent the dry alcohol being contaminated by moisture from the air.

The following examples are given for the purpose of illustrating the invention:

Example 1

25 grams of metallic aluminum granules of from 20 to 30 mesh were added to 800 parts by weight of 98% isopropyl alcohol. 0.4 gram of mercuric chloride was then added and the mixture warmed. A vigorous reaction ensued which persisted for about 15 minutes with the evolution of considerable heat. The alcohol was then distilled thru a fractionating column. When tested by the acetyl chloride method, the recovered alcohol was found to be absolutely anhydrous in quality.

Example 2

130 grams of aluminum ethylate were added to 800 parts by weight of 95% ethyl alcohol in a closed vessel and the mixture warmed to effect solution, and refluxed for about 15 minutes. The alcohol was then distilled thru a fractionating column and condensed into a container equipped with a dehydrator to prevent infiltration of moisture from the air. When tested with acetyl chloride, the recovered alcohol was found to be absolutely anhydrous.

The foregoing disclosure and examples are given for the purpose of illustration only and are not to be construed as in any way limiting the invention.

What is claimed is:

1. The method of producing absolutely anhydrous alcohol which comprises adding metallic aluminum to a mixture of alcohol and water containing an amount of water up to its azeotropic mixture, adding an activator comprising at least one of the group consisting of mercuric salt, iodin and stannic chloride, warming the mixture to initiate the reaction and after the reaction has subsided, fractionating off the absolutely anhydrous alcohol.

2. The method of producing absolutely anhydrous isopropyl alcohol which comprises adding to a mixture of isopropyl alcohol and water containing an amount of water up to that found in its azeotropic mixture, a stoichiometrical proportion of granular aluminum, based upon the water present in the alcohol, adding 1½% of mercuric chloride based upon the granular aluminum present, warming the mixture to initiate the reaction and after the reaction has subsided, fractionating off the absolutely anhydrous isopropyl alcohol.

CHARLES A. COHEN.